United States Patent [19]

Chitwood et al.

[11] Patent Number: 4,784,883
[45] Date of Patent: Nov. 15, 1988

[54] LIQUID CRYSTAL CELL AND METHOD OF ASSEMBLY OF SAME

[75] Inventors: Donald P. Chitwood; Raymond D. Wilson, both of Portland; Duane A. Haven, Milwaukie, all of Oreg.

[73] Assignee: Tektronix, Inc., Beaverton, Oreg.

[21] Appl. No.: 46,826

[22] Filed: May 5, 1987

[51] Int. Cl.$^4$ .............................................. C09K 19/00
[52] U.S. Cl. ........................................ 428/1; 428/65; 350/330; 350/334
[58] Field of Search ...................... 428/1, 65; 350/356, 350/355, 330, 331 R, 334

Primary Examiner—Alexander S. Thomas
Attorney, Agent, or Firm—John D. Winkelman; Paul S. Angello

[57] ABSTRACT

A liquid crystal cell (40) for an electron beam-addressed liquid crystal light valve has a rigid glass substrate (16) and target substrate (44) formed of thin flexible material. The cell (40) is constructed so that the spacing between the flexible substrate (44) and the rigid substrate (16) is precisely maintained. A fixture (72) is employed for attaching the target substrate (44) to the rim (102) of the light valve body (14) prior to assembly of the cell (40).

4 Claims, 3 Drawing Sheets

LIQUID CRYSTAL CELL AND METHOD OF ASSEMBLY OF SAME

TECHNICAL FIELD

The present invention relates to electron beam-addressed liquid crystal light valves and, in particular, to a liquid crystal cell used in such valves.

BACKGROUND INFORMATION

One type of liquid crystal light valve is a projection-type image display apparatus. The light valve comprises an evacuated ceramic envelope that incorporates a pair of opposing transparent windows as part of the envelope wall. One window forms part of a liquid crystal cell. The remainder of the cell is assembled adjacent to the inner surface of that window. Polarized light is typically directed through the envelope windows. The light exiting the liquid crystal cell passes through a polarizing filter or analyzer. Any light passing through the analyzer is transmitted via a projection lens system onto a suitable viewing surface.

The liquid crystal cell includes liquid crystal material captured between two substrates. One substrate is formed of glass and is incorporated into the wall of the envelope to serve as a window as mentioned above. The opposing substrate comprises a thin, dielectric material. The cell is preferably of the twisted nematic type, which is constructed so that in the absence of an applied electric field (i.e., with the cell in the "OFF" state) the cell rotates by 90° the polarization direction of the projected light. With the cell in the "OFF" state, no light passes through the analyzer and the viewing surface remains dark. When an electric field is applied to the cell (i.e.. when the cell is switched to the "ON" state) the projected light passes through the cell with the polarization direction unchanged. As a result, the light passes through the analyzer to the viewing surface.

An electron beam-addressed liquid crystal light valve employs an electron beam for modulating the polarization direction of light propagating through the liquid crystal cell. Specifically, an electron gun is mounted within the light valve envelope and provides a beam of electrons that strike the side of the liquid crystal cell carrying the thin dielectric substrate, which is called the target substrate. The electron beam is deflected by suitable circuitry to raster scan the target substrate. A collector electrode is mounted within the liquid crystal light valve near the target substrate. To produce or "write" an image, the electron beam and collector electrode positioned near the target substrate cooperate to develop an electrostatic potential at certain points on the surface of the target substrate that correspond to the desired image. As a result, those points on the liquid crystal cell are switched to the "ON" state, thereby permitting associated portions of the projected light of unchanged polarization direction to pass through the valve and form the image on the viewing surface.

Copending U.S. patent application Ser. No. 046,822 of Buzak et al., entitled Liquid Crystal Light Valve with Electrically Switchable Secondary Electron Collector Electrode, filed concurrently herewith, describes a particular configuration and optimal operation mode for an electron beam-addressed liquid crystal light valve. More particularly, that application describes a write mode wherein the collector electrode is maintained at positive voltage relative to the target substrate. The electron beam bombards the target substrate with electrons of sufficient energy to result in secondary electron emissions from the target substrate surface. The secondary electrons are collected on the positively charged collector electrode. The rate of secondary electron emission is greater than the rate at which the incident electrons are delivered by the electron gun. Consequently, the beam-addressed area of the target substrate surface is driven to a positive potential. This change in potential switches the corresponding region of the liquid crystal cell to the "ON" state.

To erase the image (i.e., to switch the previously written region of the liquid crystal cell to the "OFF" state), the collector electrode is switched to a negative potential relative to the written region of the target substrate. An electron gun (either the writing gun or a separate gun) scans an electron beam over the target substrate. The resulting secondary electrons, repelled by the negatively charged collector electrode, are directed to the previously written (positively charged) regions. Accordingly, the positive potential at the previously written areas of the target substrate is removed and the corresponding region of the liquid crystal cell is switched to the "OFF" state.

The target substrate for an electron beam-addressed liquid crystal light valve as just described is preferably formed of thin dielectric material having secondary emission characteristics that permit the electron beam to be driven with relatively low electrical current. The dielectric target substrate must be thin to minimize spreading of the electric field lines produced by the charge deposited on the surface. Spreading of the electric field lines reduces the resolution of the projected image. Driving the electron beam with relatively low electrical current results in a smaller beam spot size and a correspondingly higher resolution of the produced image. A mica film of five to ten microns in thickness forms a suitable target substrate.

Prior to assembly of the liquid crystal cell, it is necessary to treat the surfaces of the cell substrates that contact the nematic material. The surfaces are treated to provide a homogeneous (i.e., parallel) surface alignment of the nematic liquid crystal material. Typically, the surface treatment is provided by vacuum-depositing silicon monoxide onto the substrate at an angle of approximately 5° relative to the plane of the substrate surface. Effective treatment of the thin flexible substrate requires that the substrate remain planar during and after the deposition process so that no irregularities occur in the silicon monoxide layer. Further, the substrate must be supported in the planar orientation without the use of clamping devices that might damage the substrate.

For proper operation of the assembled liquid crystal cell, it is important that spacing between the target substrate and the rigid glass substrate be maintained with great precision so that the thickness of the liquid crystal material is uniform throughout the cell. When a thin dielectric target substrate such as mica is used in a liquid crystal light valve, establishing precisely uniform spacing between the substrates may be difficult. The difficulty results from the flexible nature of the target substrate, which provides little spacing control. Using spacers such as numerous glass spheres distributed between the substrates provides some control; however, these spacers do not prevent the flexible target substrate from bending away from the rigid substrate or toward the rigid substrate between the spacers.

SUMMARY OF THE INVENTION

This invention is directed to a liquid crystal cell for an electron beam-addressed liquid crystal light valve that has a target substrate formed of thin, flexible material and is constructed so that the target substrate is attached to the light valve in planar orientation in a manner that permits easy handling and treatment of the substrate prior to complete assembly of the cell. Further, the spacing between the flexible substrate and the opposing rigid substrate is precisely maintained upon assembly of the cell.

The cell formed in accordance with this invention is configured to cover an aperture formed in the wall of the light valve. The aperture is bounded by a rim. The cell particularly comprises a flexible substrate, the edge of which is attached to the rim, and a rigid substrate having an inner surface. The inner surface of the rigid substrate has a flat central portion and a beveled edge. Spacers are positioned between the flexible substrate and the inner surface of the rigid substrate.

The rigid substrate is configured so that the flexible substrate is stretched when the beveled edge of the rigid substrate is secured adjacent to the rim. The resulting tension in the flexible substrate restrains movement of the flexible substrate relative to the rigid substrate. As a result, the spacing between the substrates is precisely maintained.

As another aspect of this invention, a fixture is provided to facilitate attachment of the flexible substrate to the light valve in planar orientation prior to assembly of the remainder of the cell.

As another aspect of this invention, the rigid substrate includes a fill hole extending therethrough to permit delivery of liquid crystal material to the space between the flexible substrate and the rigid substrate.

DETAILED DESCRIPTION OF THE INVENTION

Figure 1:
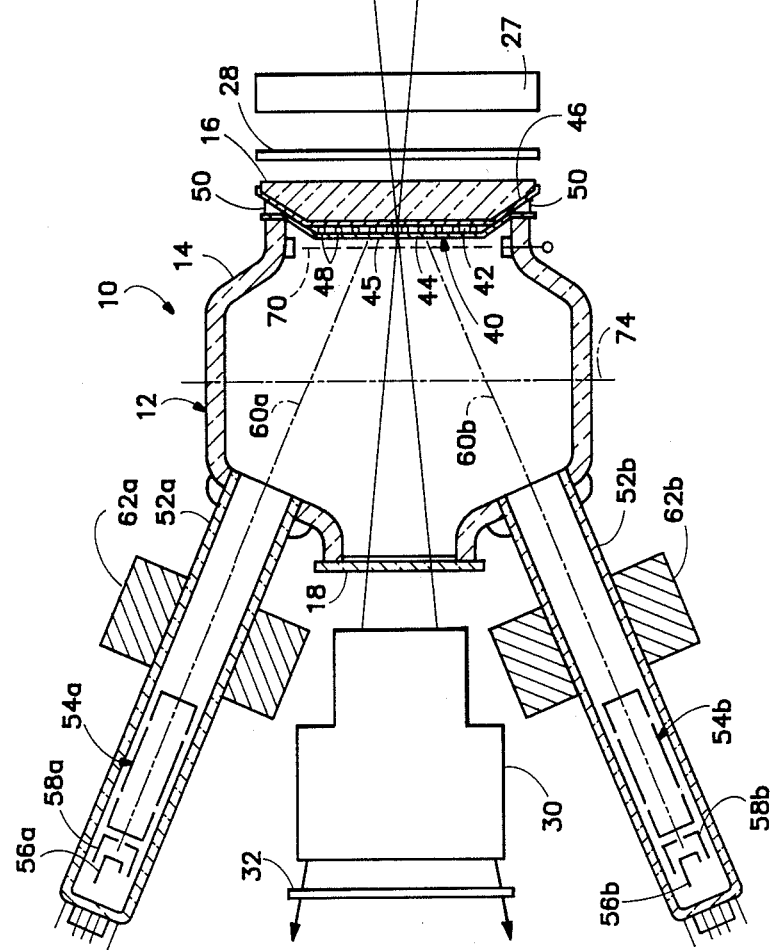
FIG. 1 is a schematic cross sectional view of an electron beam-addressed liquid crystal light valve including a liquid crystal cell formed in accordance with this invention.

FIG. 1 depicts an electron beam-addressed liquid crystal light valve 10 including a liquid crystal cell formed in accordance with this invention. The light valve comprises an evacuated envelope 12 that includes a ceramic body 14 with an optically transparent entry window or faceplate 16 and an optically transparent exit window 18 mounted thereto.

Light from a suitable source 20, such as a projection lamp 22 and a parabolic reflector 24, is directed by an input lens system 26 and a field lens system 27 through a neutral density linear polarizing filter 28 into faceplate 16. Input lens system 26 reformats the size of the area illuminated by light source 20, and field lens system 27 steers the light in the proper direction to propagate through window 18. The light exiting window 18 is projected by a projection lens system 30 through a neutral density linear polarizing filter or analyzer 32 and toward a remote viewing surface (not shown). Polarizing filter 28 and analyzer 32 are arranged so that their light transmitting axes are parallel to each other. Skilled persons will appreciate that light valve 10 can be configured to operate with orthogonally aligned light transmitting axes of polarizing filter 28 and analyzer 32.

Glass faceplate 16 of light valve 10 forms part of an internal liquid crystal cell 40 (enlarged in FIG. 1 for clarity) which is disposed in the path of the polarized projection light entering envelope 12 through faceplate 16. Specifically, cell 40 comprises a layer 42 of a nematic liquid crystal material captured between two substrates, the faceplate 16 and a thin optically transparent target substrate 44 having a surface 45. Target substrate 44 is formed of a suitable dielectric material, preferably mica. The mica can be coated with a layer of magnesium oxid (MgO) as described in copending U.S. patent application Ser. No. 46,807 of Haven et al., entitled Electron Beam-Addressed Liquid Crystal Cell, filed concurrently herewith. Other materials such as polyimide or polyester films are suitable as target substrates. The central regions of the faceplate 16 and the target substrate are held apart by spacers 48 such as glass spheres or photolithographically fabricated spacers. The faceplate 16 and substrate 44 are secured together at their edges by a ceramic frit seal as described more fully below.

An optically transparent conductive film 46 of indium tin oxide (ITO) covering the inner surface of envelope faceplate 16 serves as a backplate electrode for the cell. A DC voltage is applied to conductive film 46 to make it substantially more positive than the voltage of the cathode of the writing electron gun, which is described below.

The interior surfaces of the target substrate 44 and the ITO film 46 are treated to provide a homogeneous (i.e., parallel) surface alignment of the nematic liquid crystal material. The alignment directions of the two surfaces are perpendicular and provide a 90° twist cell. The desired surface treatment is provided in a known manner, such as by vacuum-depositing silicon monoxide (SiO) onto each surface at an angle of about 5° relative to the plane of the surface. The deposited material on each surface is known as an alignment layer.

One type of nematic liquid crystal material suitable for use in cell 40 is commercially available from E. Merck as ZLI 2244.

The molecules of the nematic liquid crystal material in layer 42 are ordered such that the polarization direction of plane polarized light passing through the cell is rotated 90 in the absence of an applied electric field (i.e., with the cell in the "OFF" state). Whenever a potential difference is developed across any region of the liquid crystal material, the longitudinal axes of the liquid crystal molecules in that region tend to align in a direction parallel to the resulting field, thereby decreasing the amount of rotation of the polarization direction of the light passing through that region of the cell 40. If the potential difference across a region of cell 40 is of sufficient magnitude (i.e., with that region of the cell fully in the "ON" state), the polarization direction of the light passing through that region of the cell remains substantially unchanged. Since the light-transmitting axes of both polarizing filter 28 and analyzer 32 are parallel, light passes through regions of the analyzer that correspond to those of cell 40 that are in the "ON" state. The analyzer prevents the passage of light in regions corresponding to regions of the cell that are in the "OFF" state.

Envelope 12 further comprises first and second similar elongate tubular glass necks 52a and 52b, one end of each neck being frit sealed to body 14 adjacent window 18. A writing electron emitting means or gun 54a is mounted within neck 52a. Gun 54a includes a cathode 56a, a control grid 58a, and associated electrodes for forming a narrow electron beam 60a directed at an oblique angle relative to and toward liquid crystal cell 40. Conductive film 46 is held at a very high positive potential relative to the potential applied to cathode 56a of gun 54a and, therefore, contributes to the acceleration potential of writing beam 60a. Video or other input signals are applied to grid 58a to modulate the beam current of electron beam 60a in accordance with the image to be projected onto the remote viewing surface.

Modulated writing beam 60a is raster scanned across the surface of target substrate 44 by suitable electrical signals supplied by deflection circuitry (not shown) to an electromagnetic deflection yoke 62a supported on neck 52a. It is noted that light valve 10 could alternatively be constructed with an electrostatic deflection structure. Writing gun 54a is operated so that the electrons in beam 60a strike the surface of target substrate 44 with an energy adequate to create secondary electron emissions from the surface of the target substrate 44 at a rate that exceeds the rate at which incident electrons are delivered to the target substrate by the writing gun 54a.

A secondary electron collector electrode 70, preferably of the grid type or mesh type, is mounted within the envelope 12 in substantially parallel, opposed relation to the surface 45 of target substrate 44. Writing beam 60a is directed through electrode 70 and toward target surface 45. The electrode 70 is positively charged relative to the target substrate when the writing gun 54a is operated.

Whenever writing beam 60a is raster scanned over target surface 45, a collector electrode controller circuit (not shown) applies a potential of about +300 volts to electrode 70, which collects the secondary electrons emitted from the target substrate 44. Consequently, the region of target surface 45 struck by the writing beam 60a is charged to a positive electrostatic potential. This change in potential switches on the corresponding region of the liquid crystal cell to the "ON" state.

An erasing electron gun 54b is mounted within neck 52b. Gun 54b includes a cathode 56b, a control grid 58b, and associated electrodes for forming a narrow electron beam 60b that is directed at an oblique angle relative to and toward target substrate 44 of liquid crystal cell 40. After a complete raster scan of the surface of target substrate 44 by writing beam 60a, erasing beam 60b is raster scanned across the surface of target substrate 44 by suitable electrical signals supplied by deflection circuitry (not shown) to an electromagnetic deflection yoke 62b supported on neck 52b. It is noted that light valve 10 could alternatively be constructed with an electrostatic deflection structure.

Erasing gun 54b is operated in a manner similar to that of writing gun 54a in that the electrons in beam 60b strike the surface of target substrate 44 with an energy adequate to create secondary electron emissions from the surface of target substrate 44 at a rate that exceeds the rate at which incident electrons are delivered to the target substrate by the erasing gun.

Whenever erasing beam 60b is raster scanned across the surface of target substrate 44, the electrode 70 is held at a zero volts relative to the potential on conductive film 46. Such a potential on electrode 70 causes the secondary electrons to redeposit primarily on the surface of target substrate 44, and thereby erase the image that had previously been written by writing beam 60a. The image can, of course, be maintained by rewriting it at a suitable refresh rate. In a 60 Hz noninterlaced display monitor for computers, for example, each field would be scanned by the writing beam every 16⅔ milliseconds, but information would be written in alternate fields. The display would be erased in the field during which no writing takes place. Therefore, the information refresh rate would be 33.33 milliseconds.

Figure 2:
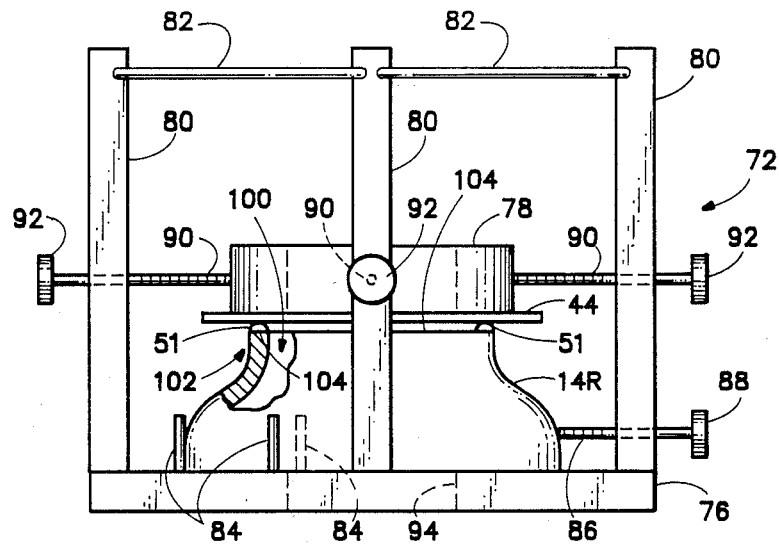
FIG. 2 is a diagram of a fixture used for assembly of a liquid crystal cell that is incorporated in the light valve of FIG. 1.

Turning now to the particulars of the liquid crystal cell formed in accordance with this invention, FIG. 2 shows a diagram of a fixture 72 employed for attaching the flexible target substrate 44 to the ceramic body prior to assembly of the remainder of the liquid crystal cell 40. Before discussing the particulars of the fixture, it is noteworthy that the body 14 of the light valve 10 is comprised of two components joined together in a known manner along a center line 74 (FIG. 1). Preferably, the flexible substrate 44 is attached to the body 14 before the two body components are joined. In this regard, FIG. 2 depicts one component 14R of the valve body 14 (i.e., the portion of the valve body to the right of center line 74 in FIG. 1) secured in the fixture 72. Specifically, valve body component 14R is placed upon a flat base plate 76 so that the upper end of the valve body component is the end that carries the liquid crystal cell. This end of the body component 14R has an annular rim 102 that bounds an aperture 100. The rim is formed to have a planar outer face 104. The outer face 104 is covered with ceramic frit 51 in an amount adequate to cover approximately 60% of the outer face of the rim with approximately 7 microns of frit after the frit is melted as described below. It is the innermost area of the outer face that is covered with the frit 51.

The target substrate 44 is placed on top of the frit 51 to cover the aperture 100. Preferably, the flexible substrate 44 is initially sized to extend radially beyond the frit-covered portion of the rim to facilitate handling prior to attachment to the rim. Afterward, the portion of the substrate that extends beyond the rim is cut away (See FIG. 3). The portion of the outer face 104 that is not covered with frit 51 provides a bonding surface that permits effective bonding between the rim 102 and the rigid substrate 16 as described below.

A hollow cylindrical ceramic weight 78 is placed upon the flexible substrate 44 so that the load of the weight 78 is uniformly distributed along the radial center of the outer face 104 of the rim. The ceramic weight holds the target substrate 44 substantially flat and parallel to the plane defined by the outer face 104 of the rim. Under the force of gravity the ceramic weight 78 urges the target substrate 44 toward the rim 102.

Preferably, the body component 14R and ceramic weight 78 are restricted against sliding relative to each other, thereby preventing such movement after the frit 51 is melted as described below. Sliding of the ceramic weight 78 relative to the body component 14R while the frit is melted is undesirable because it can result in irregularities (ripples, cracks, etc.) in the attached target substrate 44. Accordingly, the fixture 72 includes mechanisms for securing the body component 14R to the base plate 76 and for guiding the movement of the ceramic weight 78 so that the weight will only move toward the body component in a direction normal to the plane of the rim outer face 104.

More particularly, four guideposts 80 (only three of which appear in FIG. 2) are fastened to extend upwardly from the base plate 76, evenly spaced around the body component 14R and ceramic weight 78. The tops of the guideposts are joined by bars 82 welded thereto to stiffen the fixture and provide means for carrying the fixture. Three alignment pins 84 are fixed to extend upwardly from the top surface of the base plate 76. The alignment pins 84 are arranged on one side of the base plate and cooperate with an alignment screw 86, which is threaded through a guidepost 80, in order to secure the body component 14R against sliding movement along the base plate. That is, the alignment screw 86 is manually adjusted via a knob 88 to extend into contact with the body component and force it against the stationary guide pins 84.

Above the valve body component 14R each guidepost 80 has an alignment screw 90 threaded through it. These alignment screws are manually adjustable via knobs 92 to extend into contact with the side of ceramic weight 78. The alignment screws 90 are tightened against the ceramic weight to prohibit horizontal movement of the ceramic weight without impeding vertical movement of the weight and substrate toward the valve body component 14R in a direction normal to the plane of the rim outer face 104.

The valve body component 14R, frit 51, target substrate 44 and ceramic weight 78, assembled on the base plate 76 of the fixture as just described, are next heated to a temperature just above the melting point of the frit, which for conventional devitrifying solder glass frit is approximately 450° C. The fixture 72 includes a hole 94 formed through the base plate 76 to permit even distribution of heat inside and outside of the valve body component.

It is noteworthy that the surface of the ceramic weight 76 that contacts the target substrate is polished to eliminate any friction forces tending to resist expansion of the target substrate in the plane of the substrate as the assembly is heated.

After the frit is completely melted, the assembly is cooled. As the frit cools it solidifies and bonds the edge of the substrate 44 to the outer face 104 of the rim 102. The material comprising the valve body component 14R has a coefficient of thermal expansion that is lower than the coefficient of thermal expansion for the target substrate. Consequently, after the frit 51 solidifies to bond the edge of the target substrate to the rim, tension is progressively developed in the target substrate as the entire assembly is further cooled to room temperature. In the preferred embodiment the valve body component 14R is formed of forsterite which, in the range of temperatures discussed herein, has a coefficient of thermal expansion of approximately $91 \times 10$ in/in °C. The preferred mica target substrate has a coefficient of thermal expansion ranging from 1.5 to 3.5 times higher than that of forsterite.

Once the target substrate is attached to the rim as just described, it is easily handled for cleaning, etc., as an integral part of the ceramic valve body component. Further, the resulting tension in the target substrate after cooling of the assembly holds the substrate in a planar orientation for the application of an alignment layer as mentioned above. It can be appreciated that the tension in the substrate resists the creation of ripples or other irregularities in the substrate that might otherwise occur during the deposition of the alignment layer if the target substrate were not adequately supported.

Figure 4:
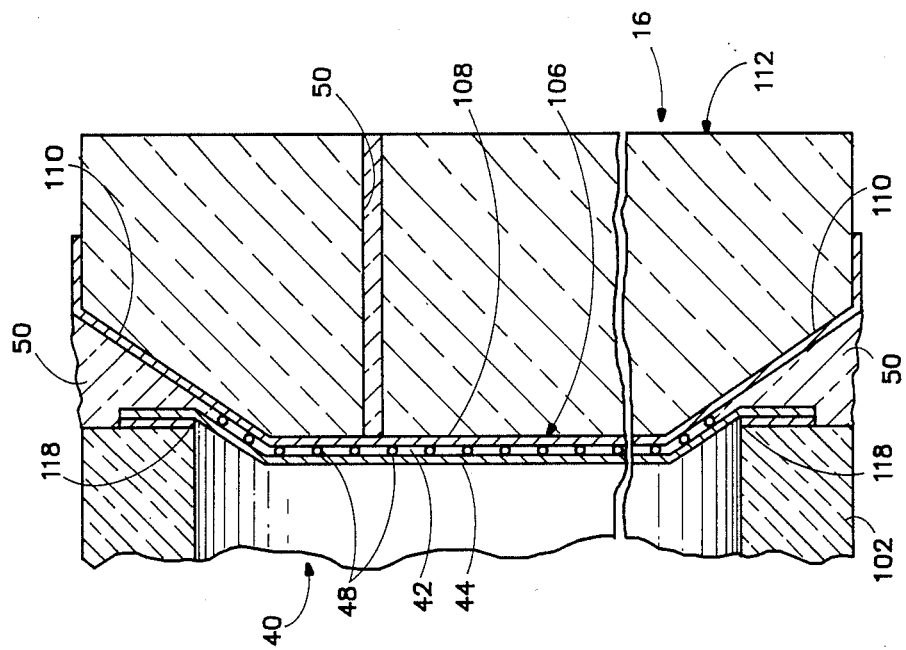
FIG. 4 is an enlarged view of the assembled liquid crystal cell of FIG. 3.
Figure 3:
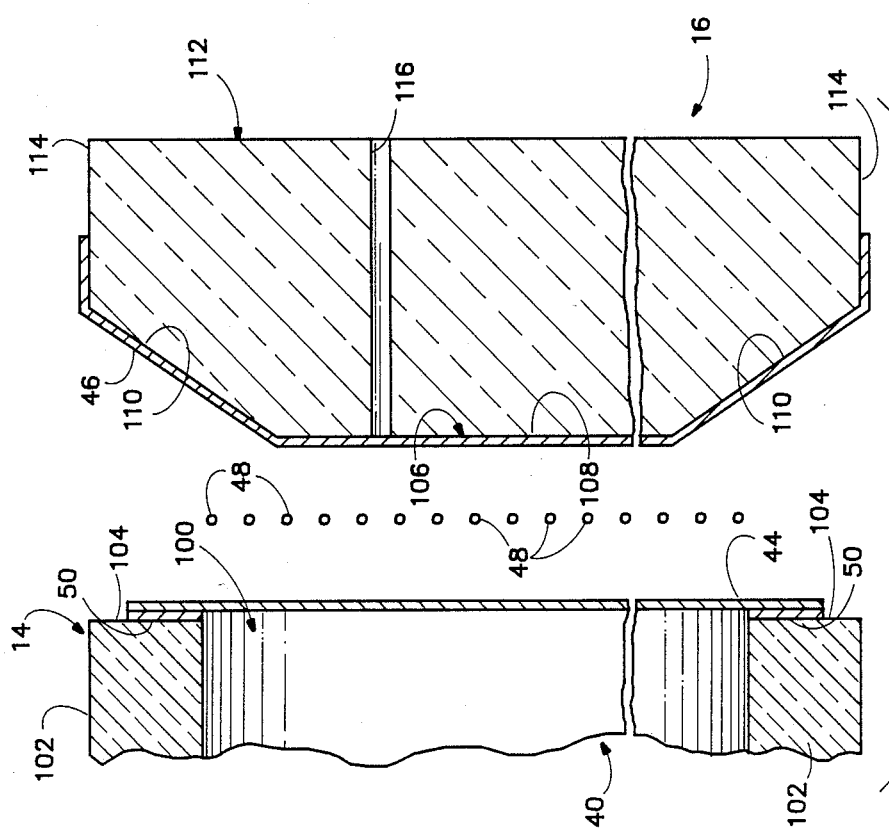
FIG. 3 is an exploded enlarged view of the liquid crystal cell.

Referring to FIGS. 3 and 4, the final stage of assembly of the liquid crystal cell is now described. The faceplate 16, which also serves as the opposing substrate of the liquid crystal cell 40, is formed of glass. The faceplate 16 has an inner surface 106 facing the interior of the ceramic body 14. The inner surface 106 includes a central portion 108 and a beveled edge 110. The central portion 108 of the inner surface 106 is in plane parallel relation to the outer surface 112 of the faceplate.

The ITO film 46 is deposited on the inner surface 106 of the faceplate 16. The edges of the film extend over the inner surface onto part of the side surface 114 of the faceplate. The portion of the conductive film 46 extending over the side surface of the fcceplate 16 is exposed after assembly of the cell 40, thereby providing a region for connection to a suittable voltage source. As mentioned earlier, the conductive film 46 is held at a high positive potential relatve to the cathodes of the writing and erasing electron guns 54a, 54b, thereby contributing to the acceleration pot-ential of the electron beams 60a, 60b. Further, the conductive film 46 forms an electrode on one side of the liquid crystal cell for cooperation with the electron beams and electrode 70 to create fields across the cell necessary to switch regions of the cell to the "ON" and "OFF" states.

Spacers 48 are disposed between the film 46 and the target substrate 44. The spacers are preferably glass spheres having a diameter of approxmately six to eight microns, or photolithographically fabricated spacers arranged in a fixed array on the surface of the target substrate 44. One suitable method of positioning the glass sphere spacers 48 is by spraying onto the film a jet of air that has spacers suspended in it. Electrostatic attration between the film and the spacers holds the spacers in place until the cell is completely assembled.

A fill hole 116 for introducing liquid crystal material 42 into cell 40 is formed to extend completely through the faceplate 16 and film 46. The fill hole 116 provides a fluid communication path from the outer surface 112 of the faceplate to the space between the target substrate 44 and the film 46.

Prior to assembly of the cell, the ITO film is treated to provide the surface alignment layer as described earlier.

To complete assembly of the cell, the rigid glass faceplate 16 is pressed against the target substrate 44. The central portion 108 of inner surface 106 of the faceplate is smaller than the aperture 100. As a result, the inner surface of the faceplate penetrates the plane of the outer face 104 of the rim 102 and passes into aperture 100. The faceplate 16 is pressed against the substrate 44 until the beveled edge 110 of the inner surface is adjacent, but not contacting, the inner circumferential corner 118 on the rim. Bearing contact between the beveled edge 110 and the corner 118 with the target substrate therebetween is avoided so that no shear stresses are developed in the target substrate.

As noted earlier, the target substrate 44 is initially attached to the rim 102 under tension, and oriented to extend across the aperture in a plane parallel to the plane of the outer face of the rim (FIG. 3). Consequently, as the target substrate 44 is forced out of its original plane by the advancing rigid faceplate 16, additional tensile stresses are created within the target substrate as the target substrate is stretched. The combined tensile stresses in the substrate effectively resist movement of the target substrate toward or away from the inner surface 106 of the faceplate.

The faceplate 16 is held against the stretched target substrate 44 so that a portion of the beveled edge 110 extends outwardly from the aperture 100. The resulting gap between the beveled edge 110 and the rim 102 is sealed with ceramic frit 50. The frit 50 extends across the entire outer face 104 of the rim, including the portion of the outer face not covered with the target substrate 44.

After the cell is assembled, the nematic liquid crystal material 42 is delivered through the fill hole 116 to fill the space between the target substrate and the central portion 108 of the inner surface 106 of the faceplate. Afterward, the fill hole is plugged with ceramic frit 50.

While the present invention has been described in relation to a preferred embodiment, it is to be understood that various alterations, substitutions of equivalents and other changes can be made without departing from the underlying principles of the invention. For example, certain types of liquid crystal cells do not require polarized light to modulate incident light electrooptically. As another example, the liquid crystal light valve can be operated in more than two states to provide images of different gray scale intensities. The scope of the invention is defined, therefore, in the appended claims.

We claim:

1. A liquid crystal cell mounted to an annular rim, comprising:
   (a) a flexible substrate, the edge of the flexible substrate being attached to the rim;
   (b) a rigid substrate, one surface of the rigid substrate having a substantially flat central portion and a beveled edge;
   (c) spacer means positioned between the flexible and rigid substrates for maintaining space between the flexible substrate and the central portion of the surface of the rigid substrate; and
   (d) bonding means for securing the beveled edge of the rigid substrate adjacent to the rim, the rigid substrate and rim being configured and arranged so that the flexible substrate is stretched when the rigid substrate is secured adjacent to the rim.

2. The liquid crystal cell of claim 1 wherein the rim defines an aperture, and wherein the central portion of the rigid substrate surface is disposed within the aperture and at least a portion of the beveled edge of the rigid substrate is disposed outside of the aperture.

3. The liquid crystal cell of claim 2 wherein the rigid substrate is configured to form a gap between the rim and the portion of the beveled edge disposed outside of the aperture, the gap configured to receive the bonding means.

4. The liquid crystal cell of claim 1 further including filling means for delivering liquid crystal material to the space between the flexible and rigid substrates.

* * * * *